Patented Nov. 4, 1930

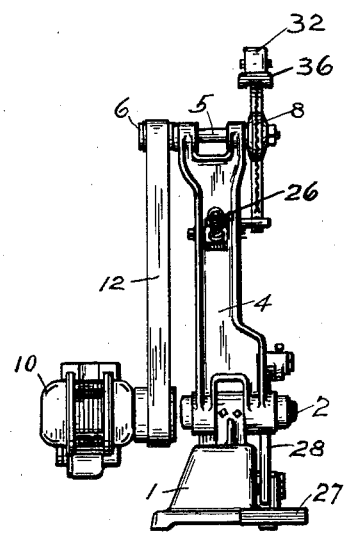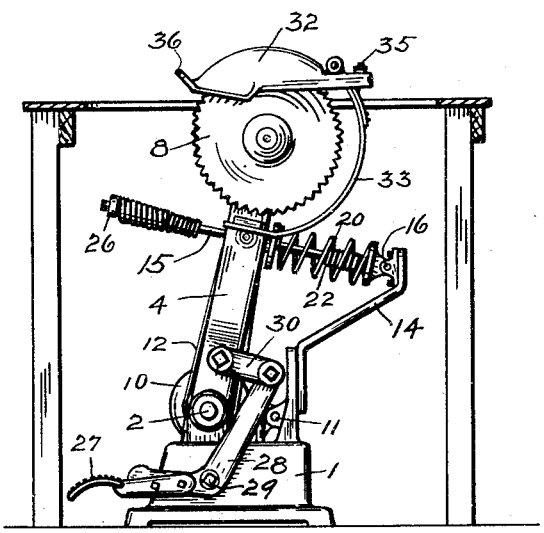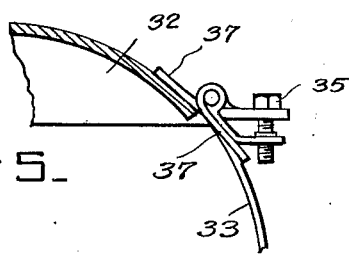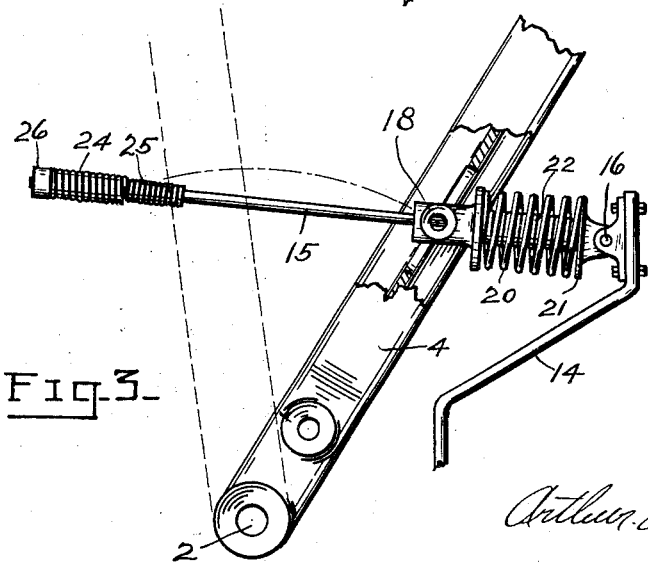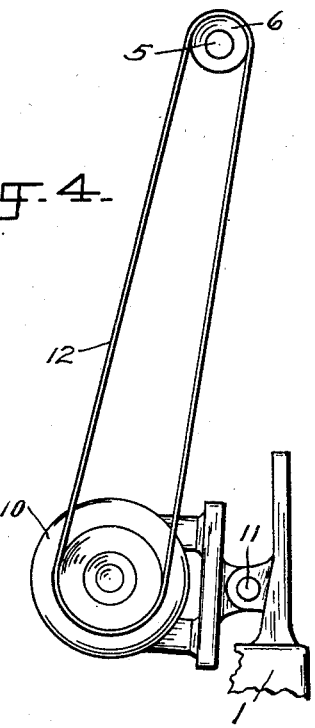

1,780,176

UNITED STATES PATENT OFFICE

ARTHUR E. DE KONING, OF PORTLAND, OREGON

SAWING MACHINE

Application filed February 25, 1928. Serial No. 256,931.

My invention relates to sawing machines in which a translatory motion of a revolving circular saw blade effects the severance of boards so placed as to be engaged thereby, and more particularly to means providing for the propulsion of the saw blade and carriage therefor in rapid oscillatory motion to effect an intermittent engagement of the saw with the work, and other cooperative devices affecting the efficiency of the machine.

The principal object of my invention is to provide a substantial saw carriage in such a machine susceptible of rapid oscillation by a minimum of energy supplied by the foot of the operator.

A second object is to provide for a variable rate of oscillation of the saw and carriage independent, to a great extent, of the magnitude of the force applied to the actuating members, and thereby to reduce the hazard of operating such a sawing machine as well as to provide for increased production.

Further objects are: to provide for the efficient transmission of power from the motor to the saw, to render the machine compact and inexpensive of construction, to provide for the mounting of all working parts upon a single base, and to guard the saw effectually.

Other objects and advantages of my invention, and the embodiment thereof in a typical machine of the kind, are described in the following discourse wherein the significance of the reference numerals in the accompanying drawing is explained.

Figure 1 is a front elevation of the entire machine; Fig. 2 is a side elevation of the entire machine and a sawing table of the kind with which the machine is commonly used; Fig. 3 is a diagram in which the two extreme positions of the saw carriage with reference to the means for limiting its motion are shown; Fig. 4 is a view of the motor and devices employed to drive the saw arbor, normal to the axes of rotation of said motor and saw arbor.

Figure 5 represents a view of a fragment of the machine and saw guard from which a portion has been broken away to reveal the disposition of a spring serving to return the saw guard to its normal position.

The reference numeral 1 indicates the base upon which are mounted all of the other members. A shaft 2 is fixed in this base transversely so as to provide two laterally disposed pintles upon which the carriage 4 is pivotally mounted. Two bearings are provided at the upper end of the carriage 4 in which is rotatably mounted the saw arbor 5 carrying the driven pulley 6 and the saw 8.

An electric motor 10 is pivotally mounted upon a shaft 11 which is in turn secured in the base 1 at about the same level as and parallel with the shaft 2. The weight of the motor is supported by the driving belt 12. The shafts 2 and 11, the arbor 5, and the motor shaft are held in parallel and adjustable relationship by this manner of construction.

A bracket 14, attached to the base 1, provides a place for the pivotal attachment of one end of a rod 15, said pivotal attachment being shown at 16 (Figures 2 and 3).

This rod 15 is further supported in a trunnioned box 18 (Figure 3) fitted to slide upon said rod and attached to the carriage 4. One end of the box 18 is formed so as to provide a place of attachment for the large helical spring 20 which at its other end is attached to a piece 21 adapted to pivotal attachment to the bracket 14 at the point 16, and into which the rod 15 is screwed. A smaller helical spring 22 disposed within the spring 20 is free upon the rod 15.

At the opposite end of the rod 15, two springs 24 and 25 are mounted loosely thereon and retained by a stop 26 which may be fixed at various positions along the rod 15. These springs are of different strengths.

A treadle 27 is attached to the bell-crank 28 in turn pivotally attached to the base 1 at 29 (Fig. 2). A link 30 connects the remaining arm of the bell-crank 28 with the carriage 4. By the particular proportions of the arms of the bell-crank 28 and the location of the point of attachment of the communicating link 30 upon the carriage 4 with reference to its center of oscillation, a relatively great movement of the saw is provided for with only slight vertical movement of the treadle 27.

A saw guard 32 is hinged to the bracket 33 in turn rigidly attached to the carriage 4. A wire spring 37 disposed at the hinged joint between the saw guard and bracket therefor engages said guard and bracket so as to constrain the guard downward. An adjusting screw 35, engaging the rear part of the saw guard so as to limit the motion of the guard upon its hinge effected by the spring 37, provides for adjustment of the guard to suit various thicknesses of lumber.

The manner of operation of the machine is as follows:

When pressure is exerted upon the treadle 27, the carriage 4 will be moved forward. The velocity with which the saw and carriage move forward will depend upon the force exerted upon the treadle as related to the respective weights and relative velocities of the various parts so actuated. The energy communicated to the machine by the operator's foot will be resolved into kinetic energy manifested in the motion of the saw carriage and cooperating parts which, to be of appreciable strength, must unavoidably have considerable weight.

The carriage thus proceeding forward extends the spring 20 and finally engages the reflecting springs 24 and 25, compresses them to an extent commensurate with the energy represented by the moving mass, and is thereupon reflected or thrown back without loss of energy as the operator relaxes his effort upon the treadle. The carriage recedes to the opposite position and compresses the large spring 20, whose neutral form is somewhat extended, and, if the force be great enough compresses the smaller spring 22. The springs 22 and 24 are of comparable strengths and act as buffers to prevent collision of irresilient parts as well as to supplement the two weaker springs should their limits of elasticity be exceeded. It is thus apparent that the spring 20 functions both as a reflecting member and as a reservoir for sufficient energy to insure the return of the saw (and carriage) to its rear position; supplementing the pressure exerted by the operator who might not at first depress the treadle forcibly enough to insure the backward stroke through the medium of the reflecting springs alone. In any case such effort as shall have been expended will be, with succeeding exertions upon the treadle, cumulative, and contribute to the ultimate velocity attained by the carriage in its oscillatory movement.

It will be observed that this machine is distinguishable from others of the kind wherein weights are used to reflect the saw carriage in reciprocal motion by reason of the following peculiarities of operation:

The amplitude of the movement of the saw carriage being definitely limited, increases in the velocity at which the carriage moves back and forth between its limits of travel will result in greater frequencies of oscillation, and, hence a greater number of cuts per minute.

The weight of the saw carriage does not affect the frequency of oscillation possible with a given power as is the case where unrestricted pendulous counterweights are employed, and to which class of machines the laws of the pendulum apply.

The use of weights involves a commensurate burden of friction whereas in this machine the reflecting device operates almost without friction.

Therefore this machine is free of any adventitious horologic peculiarities.

Energy to pull the saw through the cut is largely supplied from the motor transmitted to the saw carriage through the belt, pulleys and shafts, when the rotary motion of the saw is resisted by contact with the work.

The driving belt is automatically and uniformly tensioned by the weight of the motor.

The saw guard 32 being formed with an inclined lip 36, and being hinged at the rear is thereby adapted to slide upon the board at its forward end despite the fact that the guard is actuated in its horizontal travel by its support, the bracket 33, which moves in curvilinear motion, thus affording a high degree of protection against accident.

Various speeds of operation are determined by the location of the stop 26 upon the rod 15; the shorter the stroke the more rapid the oscillations.

Having described my invention what I claim is:

1. In sawing machines, a base, a saw carriage pivotally mounted thereupon, a rod pivotally attached to said base above the said pivotal attachment of the said saw carriage at one end extending through the said saw carriage and fitted with an adjusting screw and nut at its other end, a pair of oppositely disposed reflecting springs mounted upon said rod so as to engage the said saw carriage at either end of the stroke thereof, a relatively larger spring to return the said saw carriage to its position of equilibrium whereat said spring will be strained in neither direction, having a greater amplitude of movement in compression or extension than either one of said pair of reflecting springs, rigidly secured to the said saw carriage at one end and to the said base or an extension thereof at the other end and of such length relative to the said reflecting springs and the said rod as to be compressed when said saw carriage makes contact with one of said reflecting springs, and be extended when said saw carriage makes contact with the other of said reflecting springs, together with a treadle and connecting gear for oscillating said saw carriage.

2. In sawing machines having an oscillatory saw carriage whose amplitude of movement is limited by two oppositely disposed reflecting springs arranged to engage said saw carriage at either extremity of its movement, a third relatively larger spring rigidly secured to said saw carriage at one end and to a stationary member at its other end to return the said saw carriage to its position of equilibrium removed from either reflecting spring and whereat said spring will be of such normal length as to involve the straining thereof in both compression and extension during a complete oscillation of said saw carriage.

ARTHUR E. DE KONING.